United States Patent [19]

Tazaki et al.

[11] 3,731,199

[45] May 1, 1973

[54] MULTILEVEL SIGNAL TRANSMISSION SYSTEM

[75] Inventors: Kimio Tazaki; Hajime Yamamoto, both of Tokyo; Shigehiko Hinoshita, Yokohama; Shoji Hagiwara, Tokyo, all of Japan

[73] Assignees: Nippon Telegraph & Telephone Public Corporation, Tokyo, Japan; Fijitsu Limited, Kawasaki, Japan

[22] Filed: Apr. 18, 1972

[21] Appl. No.: 245,115

[30] Foreign Application Priority Data

Apr. 30, 1971 Japan ................................46/29081

[52] U.S. Cl. ................................................325/38 A

[51] Int. Cl. ................................................H04b 1/00

[58] Field of Search ....................325/38 A, 38 R, 41, 325/42; 340/347 AD, 347 DD; 178/68

[56] References Cited

UNITED STATES PATENTS

| | | | |
|---|---|---|---|
| 3,560,856 | 2/1971 | Kaneko | 325/38 A |
| 3,697,874 | 10/1972 | Kaneko | 325/38 A |
| 3,699,446 | 10/1972 | Sainte-Beuve | 325/38 A |

*Primary Examiner*—Daryl W. Cook
*Attorney*—Staas, Halsey & Gable

[57] ABSTRACT

Apparatus for transmitting a signal in the form of a multilevel signal over a transmission line is disclosed in which a reference level signal having fewer levels than the multilevel signal and predetermined level values are inserted in a multilevel signal train with a predetermined period. On the receiving side of the transmission line, an error of the reference level signal from the aforesaid predetermined levels is detected, and gain and DC level adjusting devices supplied with the received multilevel signal are controlled based upon the detected error for correcting variations in the DC level and/or the gain of the transmission line.

11 Claims, 12 Drawing Figures

MULTILEVEL SIGNAL TRANSMISSION SYSTEM

BACKGROUND OF THE INVENTION

1. Field of the Invention

This invention relates to apparatus for transmitting signals over conventional, low bandwidth transmission lines, and in particular, to apparatus for operating upon the transmitted signals to correct for variations in DC level and/or gain of the transmission line.

2. Description of the Prior Art

For efficient digital signal transmission employing a transmission line of relatively high performance, a signal is generally transmitted in the form of a multilevel signal to provide reduced bandwidth necessary for transmission. In this case, a transmission pulse may have one of predetermined $p$'s amplitude values and this implies that information of $\log_2{}^p$ bits can be transmitted with one pulse.

The multilevel signal transmission system necessitates correct transmission of pulse amplitudes at the expense of reduction of the bandwidth necessary for the signal transmission but many technical difficulties are introduced in correct transmission of the amplitude levels with an increase in the number of amplitude values $p$ thereof.

Namely, it is necessary for identification of the level of the received signal that the "eye" of the "eye" pattern of the received waveform be open in the vicinity of each level. Further, each level of the received multilevel signal is required to be clearly distinguishable from the other levels by the threshold level at the center of the "eye" opening in the neighborhood of each level. In the case where each level of the received multilevel signal deviates upwardly or downwardly from its threshold level, the rate of generating an error due to noise or intersymbol interference from other symbols increases. Such a deviation is considered to result mainly from gain fluctuation and DC drift of the multilevel signal transmission system and DC drift of a multilevel decoding circuit for converting the multilevel signal into a binary signal. With an increase in the number of the levels of the multilevel signal, their permissible values become very small.

SUMMARY OF THE INVENTION

It is an object of this invention, in view of the fact that the gain and DC drift of the transmission line and the DC drift of the multilevel decoding circuit generally undergo very slow changes, to provide a novel multilevel signal transmission system in which a reference level signal having fewer levels than the multilevel signal and predetermined level values are inserted in a multilevel signal train with a predetermined period for correcting the changes in the DC drift and gain.

Another object of this invention is to provide a multilevel signal transmission system in which a signal is transmitted after its DC component is removed on the transmitting side and the DC component is reproduced on the receiving side, based upon the fact that the DC component of the signal being transmitted can be corrected by inserting a reference level signal in the transmitted signal.

Another object of this invention is to provide a multilevel signal transmission system which adopts novel means for periodic insertion of a reference level signal in a multilevel signal being transmitted.

Still another object of this invention is to provide a multilevel signal transmission system in which, when a multilevel signal to be transmitted is represented in the form of a binary number of $n$'s bits, predetermined levels of a reference level signal are selected at transition points of binary digit in a desired position of the binary number and an error of the received reference level signal is detected with a binary digit of the selected position.

For attainment of the above and additional objects, the present invention provides a reference level signal having fewer levels than the multilevel signal and predetermined level values are inserted in the multilevel signal train with a predetermined period on the transmitting side, by which the DC drift of the transmission line and the multilevel decoding circuit is corrected or the DC component removed from the signal transmitted is reproduced and the gain fluctuation of the transmission system is corrected on the receiving side of the transmission line.

BRIEF DESCRIPTION OF THE DRAWINGS

These and other objects and advantages of the present invention will become more apparent by referring to the following detailed description and accompanying drawings, in which.

DESCRIPTION OF THE PREFERRED EMBODIMENTS

Figure 1A:
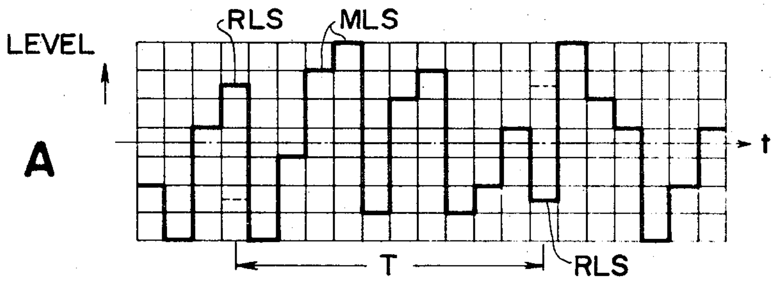
FIG. 1A shows a multilevel signal, for example, an octonary signal to be transmitted in accordance with the present invention.

The digital signal is usually transmitted over a transmission line in the form of a multilevel signal in order to reduce the bandwidth necessary for efficient digital signal transmission. FIG. 1 shows a multilevel signal to be transmitted, for example, an octonary signal, the abscissa representing time and the ordinate representing amplitude level. Reference character RLS indicates a reference level signal. In general, the levels of the multilevel signal to be transmitted are generated at random. For example, a binary reference level signal RLS is inserted in the multilevel signal with a predetermined period T of the repetitive cycle of the latter.

Figure 1B:
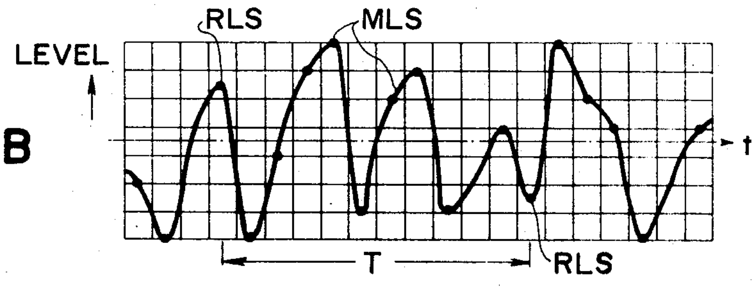
FIG. 1B shows a multilevel signal transmitted over a transmission line, smoothed by bandwidth restriction.

When a waveform such as shown in FIG. 1A is transmitted through a transmission line, it is smoothed as depicted in FIG. 1B. FIG. 1B illustrates an equalized waveform which is shaped in waveform so that the levels indicated by dots, at respective sampling times, may be of correct values. However, received waveforms are usually deformed by distortion, DC drift and gain variations of the transmission line and the levels themselves are also changed thereby. A figure commonly referred to as an "eye" pattern is used for examining the possibility of decoding each level of the multilevel signal, in spite of possible deformation of the received waveform.

Figure 2A:
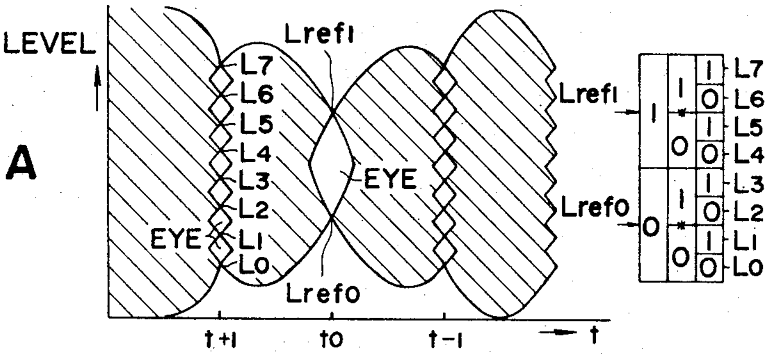
FIG. 2A illustrates an ideal "eye" pattern of the octonary signal received on the receiving side of the transmission line.

In FIG. 2A, there is shown an ideal "eye" pattern when the binary reference level signal has been inserted in the octonary signal in accordance with this invention, the abscissa representing time and the ordinate representing signal amplitude level. The letters $L_0$ to $L_7$ indicate the levels of the multilevel signal, e.g., an octonary signal; letters $Lref_0$ to $Lref_1$ represent, for example, two levels of the reference level signal, and EYE indicates the "eye" opening mentioned above. Assuming that the reference level signal RLS is received at a time $t0$, the multilevel signal may have any one of the eight levels at a time $t+1$ or $t-1$ before or after t0. In an ideal case where the levels of the received waveforms are not deformed, they always coincide the level points $L_0$ to $L_7$ at the times $t+1$ and $t-1$ and those $Lref_0$ and $Lref_1$ at the time $t0$. Accordingly, there exists in the neighborhood of the level points a region referred to as an "eye" opening EYE above in which no received waveform lies.

The received waveforms may exist in a region marked with oblique lines. The presence of the "eye" opening EYE is indispensable to the identification of the levels of the received waveforms. Namely, a threshold level is located at the intermediate level point of the "eye" opening EYE, by which it is identified whether the received waveform is of the level, for example, $L_0$ or $L_1$. On the right of FIG. 2A, there is shown the manner of establishment of the levels $L_0$ to $L_7$ and those $Lref_0$ and $Lref_1$ of the reference level signals. In particular, where the levels of the octonary signal are represented in binary numbers, they are [000], [001], [010], [011], [100], [101], [110]and [111], and the levels $Lref_0$ and $Lref_1$ of the reference level signal are selected at transition points of binary digit in a desired position of the binary number. In the illustrated example, as marked with * in the central position, the level $Lref_0$ is selected at a point where the binary digit changes from 0 to 1 and the level $Lref_1$ at a point where the binary digit similarly changes from 0 to 1. The reasons therefore will be described later on.

Figure 2B:
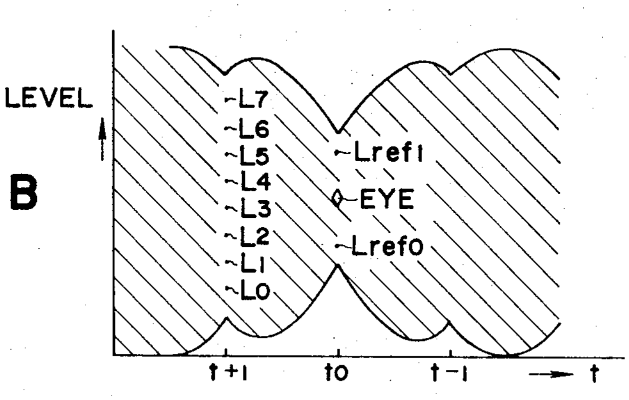
FIG. 2B illustrates an "eye" pattern in the case where the "eye" openings for multilevel decoding have been removed by distortion, DC drift and changes of the gain of the transmission line.

FIG. 2B shows the case where the levels of the received signals are changed by the transmission line and the "eye" openings EYE depicted in FIG. 2A have almost been removed. In the absence of the "eye" opening as shown in FIG. 2B, the multilevel identification is impossible. Namely, when a received signal exists, for example, between the levels $L_0$ and $L_1$ in FIG. 2B, it is impossible to judge whether the received signal is the signal of the level $L_0$ or $L_1$, or whether the received signal deviates therefrom in a positive or negative direction.

Figure 3:
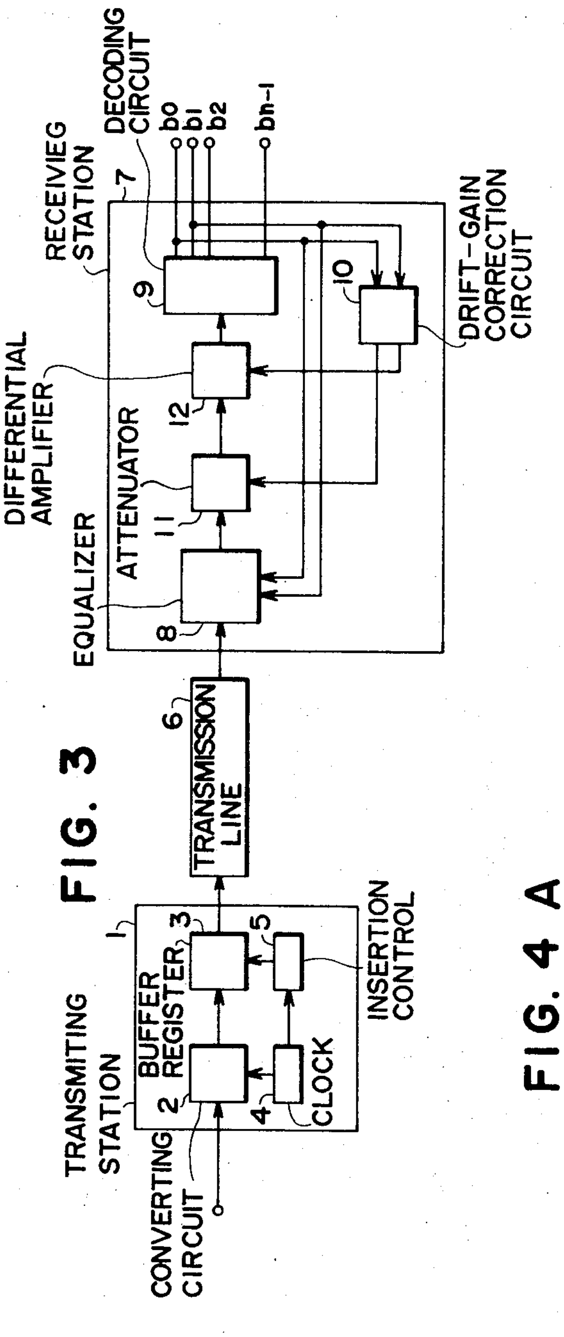
FIG. 3 shows in block form one example of a multilevel signal transmission system of this invention.

FIG. 3 illustrates one example of this invention in which, in order to prevent deterioration of the "eye" pattern such as shown in FIG. 2B, DC drift and gain variations of the transmission line are corrected by inserting the reference level signal of predetermined levels in the multilevel signal to be transmitted, and when the multilevel signal is transmitted without DC component contained therein, the DC component is reproduced on the receiving side. In the FIG. 3, the numeral 1 indicates a transmitting station, numeral 2 represents a binary-multilevel converting circuit for converting a digital signal into a multilevel signal, numeral 3 identifies a buffer register for inserting a reference level signal in the multilevel signal with a predetermined period, numeral 4 indicates a clock circuit, numeral 5 identifies a reference level signal insertion control circuit for controlling the buffer register 3, numeral 6 represents a signal transmission line, numeral 7 indicates a receiving station, numeral 8 represents a fixed or automatic equalizer, numeral 9 represents a multilevel decoding circuit, numeral 10 identifies a circuit for controlling the correction of DC drift and gain variations, numeral 11 represents an attenuator, numeral 12 indicates a differential amplifier, and $b_0$ to $b_{n-1}$ identify received and decoded output signals of $n$'s bits in binary number.

In the transmitting station 1, a digital signal to be transmitted is converted by the binary-multilevel converting circuit 2 into a multilevel signal under the control of the clock circuit 4. The binary-multilevel converting circuit 2 is one that is well known in the art, which operates such that a plurality of multilevel representing bits are written in the circuit in parallel with one another to derive therefrom one analog pulse having corresponding levels. Then, the multilevel pulse signal is written in the buffer register 3, which is controlled by the insertion control circuit 5 to insert the reference level signal in the multilevel pulse signal with a predetermined period as will be described later and from which the pulse signal is fed to the transmission line 6 in such a form as shown in FIG. 1A.

It is very difficult to select the transmission line 6 for accurate transmission of such a signal as depicted in FIG. 1A which contains a DC component. For example, in the case of base band transmission, it is difficult to employ an instrument such as a transformer or the like which inhibits the passage therethrough of the DC component and, also in the case of employing a modulation system, the DC component must be correctly amplified with an amplifier or the like. To avoid such difficulties, it is possible to transmit the signal with the DC component removed therefrom and to reproduce the DC component on the receiving side of the transmission line. In accordance with the teachings of the present invention, a DC drift resulting from the removal of the DC component can be detected with respect to the reference level signal and the DC component can be reproduced based on the detected DC drift.

For efficient transmission of the multilevel signal upon the transmission line 6, suitable modulation such as, for example, residual side band amplitude modulation or the like is sometimes achieved in accordance with the characteristics of the transmission line. Further, for enhancement of the code transmission characteristics, suitable code conversion such as, for example, error correction coding, partial response conversion or the like is also sometimes carried out in the transmitting station 1. Moreover, for reducing the bandwidth required in the transmission line 6 and avoiding the influence of noise component in the unnecessary band, the multilevel signal is usually subjected to the so-called Nyquist shaping so that the waveforms cross one another at right angles at points of integral multiples of the fundamental repetitive frequency of the multilevel signal.

The waveforms received by the receiving station 7 are usually subjected to level changes to provide such a deteriorated "eye" pattern as depicted in FIG. 2B. The received waveforms are sampled at the times $t0$, $t+1$ and $t-1$ exemplified in FIGS. 2A and 2B, at which their levels are identified to provide signals $b_0$ to $b_{n-1}$.

In FIG. 3, the received signal is equalized with the fixed or automatic equalizer 8 for eliminating intersymbol interference resulting from linear distortion of the transmission line 6. The equalizer 8 is a known one, which may be an automatic equalizer such as, for example, disclosed in BSTJ. 1966, Feb. pp. 255 to 286. The automatic equalizer is adapted to make compensation for linear distortion of the transmission line in a direction to remove intersymbol interference with subsequently received signals based upon the polarity of the received signal, those of the neighboring received signals and that of an error of the received signal relative to its predetermined level, thereby automatically correcting intersymbol interference.

The signal, which is corrected by the equalizer 8 to remove intersymbol interference therefrom, is corrected further by the attenuator 11 and the differential amplifier 12 to remove gain variations and DC drift therefrom (in a manner to be described in connection with FIG. 7), and the signal is fed to the multilevel decoding circuit 9 to derive output signals $b_0$ to $b_{n-1}$ therefrom. Of the output signals, the binary digits of the most significant digit signal $b_0$ and the less significant digit $b_1$ are used for adjustment of the attenuator 11 and the differential amplifier 12 with the control circuit 10 in accordance with the teachings of the present invention.

Figure 4A:
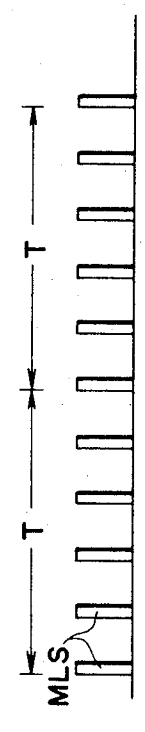
FIGS. 4A and 4B show diagrams, for explaining insertion of a reference level signal in a multilevel signal on the transmitting side of the transmission line.
Figure 4B:
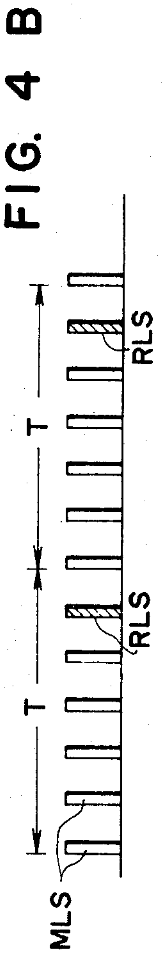
Figure 5:
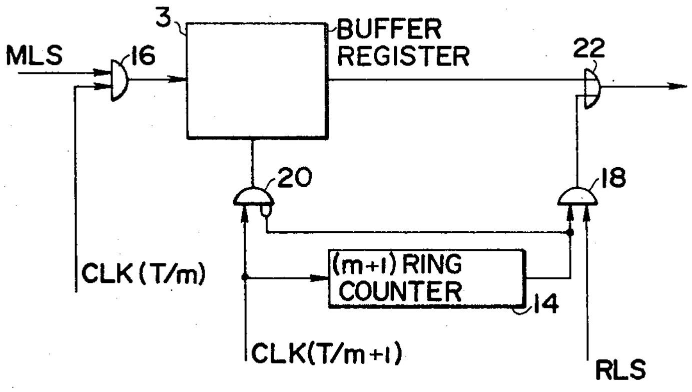
FIG. 5 illustrates in detail a reference level signal insertion circuit employed in the system shown in FIG. 3.

FIGS. 4 and 5 show in detail the principle of operation of the buffer register 3 and the control circuit 5, depicted in FIG. 3. In the figures, MLS designates a multilevel signal to be transmitted; RLS, for example, indicates a binary reference level signal to be inserted in the multilevel signal MLS; CLK identifies a clock signal; T refers to a desired period of time; $m$ represents a desired integer; the numeral 14 indicates an $(m+1)$ ring counter; numerals 16 and 18 represent AND gate circuits; and numeral 20 identifies and AND gate circuit having a NOT input.

As illustrated in FIGS. 4 and 5, the multilevel signal MLS of, for example, eight levels, which is derived from the binary-multilevel converting circuit 2 shown in FIG. 3, is written in the buffer register 3 through the AND gate circuit 16 as the AND gate 16 is enabled by a clock signal CLK(T/$m$) having a repetitive cycle T/$m$. Namely, $m$'s multilevel signals MLS are written in the buffer register 3 in the time T. Except during carry of the ring counter 14, the $m$'s multilevel signals MLS written in the buffer register 3 are read out through an OR gate circuit 22 by a clock signal CLK(T/$m$+1) of a repetitive cycle T/$m$+1 which is obtained through the AND gate circuit 20. Accordingly, the reading-out of the multilevel signals is interrupted for a period of time T/$m$+1 once (at the time of carry of the ring counter 3) in the time T. At the time of interruption of reading-out of the multilevel signals, the binary reference level signal RLS is applied to the transmission line 6 through the AND gate circuit 18 and the OR gate circuit 22.

Figure 6:
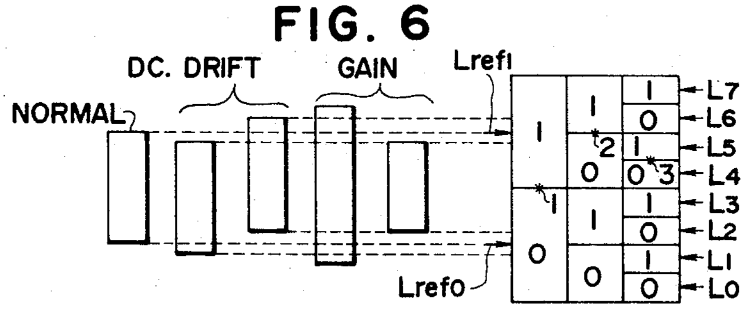
FIG. 6 is a diagram, for explaining selection of the levels of the reference level signal used in this invention and the influences of the DC drift and changes in the gain.

FIG. 6 is a diagram for explaining level selection in accordance with this invention, and level variations caused by DC drift and gain variations. The principles of correction in accordance with this invention will be explained in connection with this figure.

In the present invention, for example, the multilevel signal MLS to be transmitted has the eight levels $L_0$ to $L_7$ and the reference level signal RLS has the two levels $Lref_0$ and $Lref_1$. Namely, when each level of the multilevel signal to be transmitted is represented in binary numer of $n$'s bits (a binary number of three bits is shown in the illustrated example), the levels $Lref_0$ and $Lref_1$ of the reference level signal RLS are selected at transition points of binary digit in a desired position of the binary number. In the illustrated example, they are selected at the transition points where the binary digit of the central position changes from 0 to 1.

Consequently, in a normal condition where no change is caused in the levels of the reference level signal RLS, the binary digits of the central positions representing the levels of the reference level signal RLS are either 1 or 0 at a certain time and the frequencies of occurrence of 1 and 0 are equal to each other for a certain period of time. When the reference level signal RLS is deviated in a negative direction under the influence of the DC drift, the frequency at which the levels $Lref_0$ and $Lref_1$ of the received reference level signal are both 0 increases. While, when the reference level signal RLS deviates in a positive direction, the frequency at which the levels of the reference level signal are both 1 increases.

In the event that the gain of the transmission line has increased, the transmitted signal waveform is enlarged in its entirety in a vertical direction and the binary digit of the selected central position of the level $Lref_0$ inclines towards 0, thus providing 00 together with the more significant digit (in the illustrated example, the most significant digit), and the level $Lref_1$ is 11. When the gain of the transmission line has decreased, the level $Lref_0$ is 01 and the level $Lref_1$ is 10.

Consequently, it will be seen that the influence of the DC drift can be avoided by detecting the binary digits of the central positions of the levels $Lref_0$ and $Lref_1$ and controlling the differential amplifier 12, dependent upon whether the mean values of the binary digits incline towards 1 or 0. Further, it will be understood that the influence of the gain variation can be avoided by extracting the binary digits of the most significant position and the central one of the levels $Lref_0$ and $Lref_1$ to detect the conditions for them to become 11 or 00 and controlling the attenuator 11 in accordance with their mean values.

Figure 7:
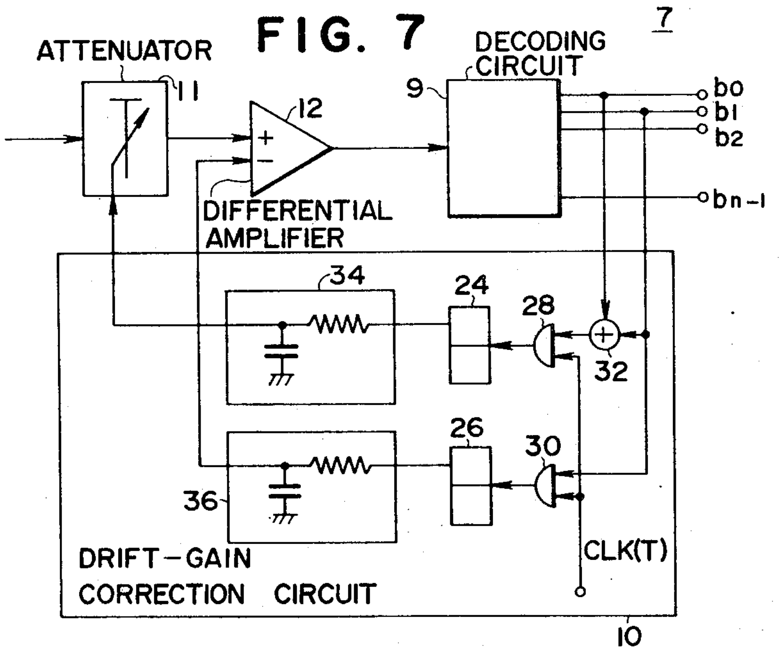
FIG. 7 illustrates a circuit construction for correcting the DC component and changes in the gain, as incorporated into the system of FIG. 3.

FIG. 7 illustrates one example of the circuit construction of this invention utilizing the principles above described in connection with FIG. 6. In FIG. 7, elements similar to those in FIG. 3 are identified by the same reference numerals and characters. Numerals 24 and 26 designate flip-flop circuits serving as memory elements, numerals 34 and 36 indicate low-pass filters for smoothing an input signal, numerals 28 and 30 represent AND gate circuits, numeral 32 identifies a coincidence circuit for calculating an exclusive OR, and CLK(T) indicates a clock signal of the cycle T of the reference level signal.

In the receiving station 7, the signal, which has been equalized by the equalizer 8 shown in FIG. 3 to remove the intersymbol interference therefrom as previously described, is decoded into binary digits of $n$'s bits ($b_0$ to $b_{n-1}$) by the attenuator 11, the differential amplifier 12 and the multilevel decoding circuit 9. In this case, as above described in connection with FIG. 6, when the levels $Lref_0$ and $Lref_1$ of the reference level signal RLS are not affected by the DC drift and gain variations, the frequency at which the AND gate circuit 28 produces an ON output is one-half of the overall total during the reception of the reference level signal RLS and the frequency at which the AND gate circuit 30 provides an ON output is also one-half of the overall total. Accordingly, the frequency at which the flip-flop circuits 24 and 26 each produce an output 1 is also one-half of the overall total and the output signals therefrom are integrated by the low-pass filters 34 and 36 to provide signals which are bias values for the attenuator 11 and the differential amplifier 12, respectively.

Assuming that the reference level signal RLS is affected by the DC drift, the flip-flop circuit 26, which is set by the output from the AND gate circuit 30, produces the output 1 or 0 at a frequency higher than one-half that during the reception of the reference level signal RLS, with the result that a minus or plus component is added by the differential amplifier 12 to signals subsequently received, thus eliminating the influence of the DC drift.

Also in the case of transmitting a signal after removing the DC component therefrom on the transmitting side of the transmission line, the DC component can be reproduced in a manner to detect the DC drift resulting from the removal of the DC component and to correct it.

When the gain of the transmission line has fluctuated, the frequency of setting the flip-flop circuit 24 changes towards a higher or lower frequency than one-half the frequency established during the reception of the lowpass level signal, and this result is averaged by the low-pass filter 34 to control the attenuator 11, thereby compressing or expanding the signals subsequently received. The clock signal CLK(T) for controlling the AND gate circuits 28 and 30 can be produced in the following manner. Namely, based upon little interrelation between the reference level signal and other multilevel signals (which implies that the levels of the multilevel signals are fully random), the signal $b_0$, which coincides with the reference level signal RLS, is searched, followed and detected by means similar to a known frame synchronizing circuit of a PCM system and the detected phase can be used as the clock signal.

Figure 8:
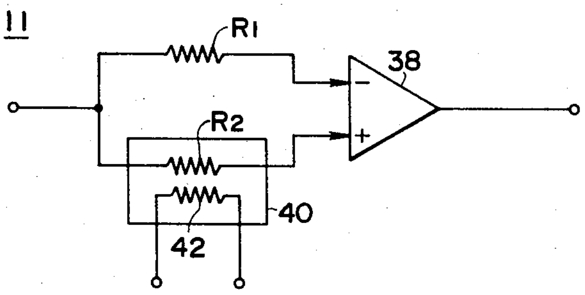
FIG. 8 shows one example of an attenuator circuit incorporated into the circuit shown in FIG. 7.

FIG. 8 shows one example of the attenuator 11 depicted in FIG. 7. Numeral 38 indicates a differential amplifier, $R_1$ represents a fixed resistor, numeral 40 identifies an indirectly-heated thermistor, numeral 42 refers to a heater, and $R_2$ indicates a thermistor resistor.

The heater 42 is connected to the output of the low-pass filter 34 of FIG. 7 to change the resistance value of the thermistor resistor $R_2$. When the low-pass filter 34 produces a predetermined bias output, the differential amplifier 38 generates an output of a constant level. When the output from the low-pass filter 34 increases or decreases, the signal applied to the attenuator 11 is derived at the output thereof after being compressed or expanded.

Figure 9:
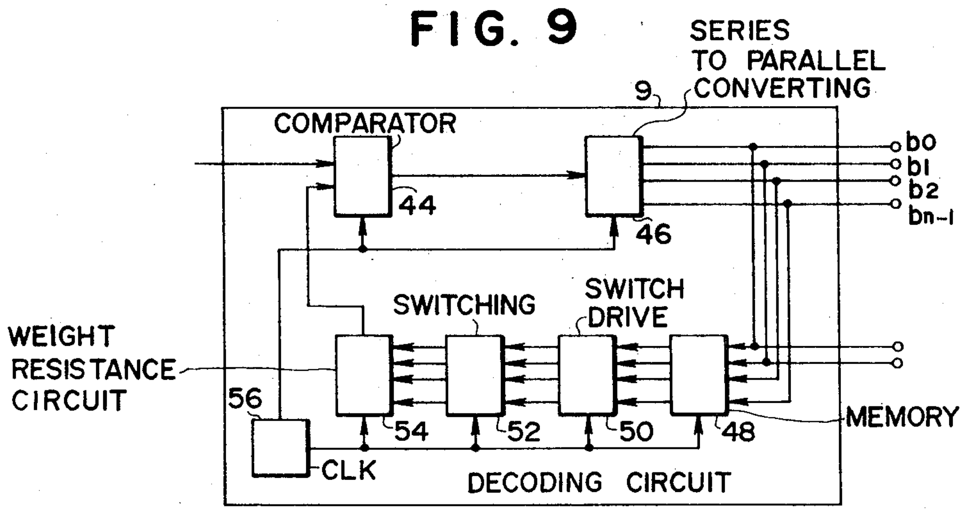
FIG. 9 illustrates one example of a multilevel decoding circuit incorporated into the correcting circuit shown in FIG. 7.

FIG. 9 illustrates one example of the multilevel decoding circuit 9 shown in FIGS. 3 and 7. The numeral 44 designates a comparator circuit for comparing the level of an input signal with a predetermined level, numeral 46 indicates a circuit for converting a series binary signal into a parallel one, numeral 48 represents a memory circuit such as a flip-flop circuit for memorizing the signals $b_0$ to $b_{n-1}$, numeral 50 refers to a switch drive circuit for controlling a switching circuit 52 in accordance with the output from the memory circuit 48, numeral 52 represents a switching circuit for supplying a constant current to a weight resistance circuit 54, numeral 54 represents a weight resistance circuit controlled by the switching circuit 52, and numeral 56 identifies a clock circuit. The multilevel decoding circuit 9 exemplified in FIG. 9 is a known circuit commonly referred to as a feedback type coder, the operation of which will hereinbelow be described briefly.

The voltage comparator circuit 44 has a voltage reference point such as shown in FIG. 6. At first, the comparison reference point is selected at the transition point of binary digit of the most significant digit as indicated by *1 in FIG. 6. When supplied with an input signal, the comparator circuit 44 produces an output 1 or 0 according to whether the level of the input signal is above or below the aforementioned comparison reference point *1. If, now, the input signal level lies at $L_5$, the comparator circuit 44 derives the output 1. The output 1 of the most significant digit is applied to the converting circuit 46 to produce a signal $b_0$ in the form of an output 1. Then, the output 1 is stored in the memory circuit 48. The memory circuit 48, in turn, controls the weight resistance circuit 54 through the switch drive circuit 50 and a switching circuit 52. As a result of this, the comparison reference point of the voltage comparator circuit 44 is raised by one-half the level and set at the transition point of the second position as indicated by *2 in FIG. 6. Then, the aforesaid input signal of the level $L_5$ is compared with the comparison reference point set as above described, to provide an output 0 as a signal $b_1$. The output 0 thus obtained is also stored in the memory circuit 48, as is the case with the aforementioned output 1 and the comparison reference point of the comparator circuit 44 is lowered by one-half the level of the second position and set at a point *3 in FIG. 6. Then, the input signal of the level $L_5$ is compared with the comparison reference point to produce an output 1 as a signal $b_2$. Thereafter, bits of less significant digits are sequentially detected by similar operations.

Since the levels $Lref_0$ and $Lref_1$ of the reference level signal RLS are selected as shown in FIG. 6, the level fluctuation of the received reference level signal can be detected directly with the binary digit of the signal $b_1$. However, this level selection is not limited specifically to the second position, but, in general, the levels of the reference level signal can be selected at the transition points of binary digit of any desired position.

As above described in the present invention, a regular reference level signal is inserted in a train of signals of random levels and level fluctuation of the reference level signal is detected on the receiving side of the transmission line and a similar level fluctuation present in signals subsequently received is corrected based upon the previously detected level fluctuation. This is based upon the following concepts that: 1) the DC drift and the gain fluctuation are changes lasting for a long time; 2) the detected level fluctuation of the reference level signal such as above mentioned, can be considered to indicate the presence of similar level fluctuation in the signals subsequently received; and 3) the DC drift and gain fluctuation of the overall transmission line can be corrected by a control system to remove the detected level fluctuation.

The number of the levels of the reference level signal to be inserted in the multilevel signal train may be more than one for DC drift control and more than two for gain control. However, it is preferred that even if the "eye" pattern is appreciably deteriorated, the "eye" opening EYE remains open as depicted in FIG. 2B and, in this sense, it is desirable that the number of the levels of the reference level signal is small, as long as the DC drift and the gain fluctuation can be detected. However, the number of the levels of the reference level signal need not be limited specifically to two as in the foregoing example. In this case, the construction of the detector circuits for the DC drift and the gain fluctuation may be simplified by dividing the level points into two groups; for example, according as they lie above and below the transition point of binary digit of the most significant digit bit $b_0$ and by pairing them from the both groups in accordance with the principles of the present invention. When the level points of each pair deviate in the same direction, DC correction is made and when the level points deviate in different directions gain correction is effected.

As above described in the present invention, and in view of the fact that the DC drift and gain fluctuation are changes lasting for a long time, a regular reference level signal is inserted in a train of signals of random levels and level fluctuation of the reference level signal is detected for the correction of level fluctuation present in subsequently received signals, so that level fluctuation caused by the aforementioned DC drift and gain fluctuation of the transmission line can be corrected, thereby to ensure correct multilevel decoding. Further, by making positive use of the correction of the DC drift, a signal can be transmitted after the DC component contained in the signal is removed on the transmitting side. Moreover, in order to insert the reference level signal RLS in the multilevel signal MLS, reading-out of the latter is interrupted for a constant period of time with the predetermined period T by utilizing the difference between the writing and reading-out speeds of the multilevel signal, so that the desired object can be attained with relatively simple means. In addition, since the levels of the reference level signal RLS are so selected as to detect the level fluctuation with the binary digit of a desired position of the received signal, the level fluctuation can be detected with much ease.

Numerous changes may be made in the above described apparatus and the different embodiments of the invention may be made without departing from the spirit thereof; therefore, it is intended that all matter contained in the foregoing description and in the accompanying drawings shall be interpreted as illustrative and not in a limiting sense.

What is claimed is:

1. Apparatus for transmitting a multilevel signal having a given number of levels over a transmission line having input and output terminals said apparatus comprising:

transmission means coupled to the input terminal of the transmission line, said transmission means including reference means for providing a reference level signal having a fewer number of levels than the given number and for inserting the reference level signal in a train of the multilevel signals at predetermined time intervals, the levels of the reference level signal being of predetermined level values; and receiving means coupled to the output terminal of the transmission line, said receiving means including detecting means for detecting an error difference between the levels of the transmitted reference level signal sampled at predetermined time positions thereof and the predetermined level values, and adjustment means responsive to the detected error difference for varying the DC level of the transmitted signal.

2. Apparatus as claimed in claim 1, wherein said adjustment means is responsive to the detected error difference for adjusting the amplitude of the transmitted multilevel signal to compensate for variations in the gain of the transmission line.

3. Apparatus as claimed in claim 1, wherein said transmission means includes means for removing the DC component from the multilevel signal and the inserted reference level signal to be transmitted, said receiving means including restoring means responsive to the detected error difference for restoring the removed DC component into the transmitted multilevel signal.

4. Apparatus as claimed in claim 1, wherein said transmission means includes:

storage means;

clock means for generating a first, repetitive clock signal at intervals of $T/m$ where T is a predetermined interval of time and m is a predetermined interger and for generating a second, repetitive clock signal at an interval of $T/(m+1)$;

means responsive to the first clock signal for storing in said storage means a train of the multilevel signals;

means responsive to the second clock signal for retrieving from said storage means a train of the multilevel signal; and means for inserting at the time intervals of T the reference level signal into the train of multilevel signals retrieved from said storage means.

5. Apparatus as claimed in claim 1, wherein each level of the multilevel signals to be transmitted is representative of a binary number of *n* bits where n is a predetermined integer, said transmission means including means for providing the levels of the reference level signal of a selected magnitude at the transition points of binary digit of a selected position.

6. Apparatus as claimed in claim 5, wherein said detection means detects the error difference between the levels of the transmitted reference level signal and the predetermined level values as determined by the binary digit of the selected position.

7. Apparatus as claimed in claim 6, wherein said detection means detects the error difference between the levels of the received reference level signal and the predetermined level values for at least two level values and said adjusting means combines at least two binary digits of the selected position, to correct for a change in the DC level of the transmission line.

8. Apparatus as claimed in claim 6, wherein said detection means detects the error difference between the levels of the transmitted reference level signal and the predetermined level values by extracting at least two levels, and said adjusting means effects correction in the gain of the transmission line by combining at least four binary digits of the selected position and a more significant position.

9. Apparatus as claimed in claim 6, wherein said detection means determines the error difference between the levels of the transmitted reference level signal and the predetermined level values with respect to the binary digit of the selected position to provide signals 1 and 0 of the binary digit, said detection means including filter means for integrating the binary signals; and said receiving means further includes differential amplifier means responsive to the integrated output signal of said filter means, for varying the DC level of the transmitted multilevel signal to compensate for variations in the DC level of the transmission line.

10. Apparatus as claimed in claim 6, wherein said detection means detects the difference between the levels of the received reference level signal and the predetermined level values, with respect to the binary digit of the selected position and that digit of a more significant digit, to provide output signals indicative of the difference in the form of a 1 and 0, the binary output signals corresponding to the two binary digits; said receiving means further includes coincidence means responsive to the two output signals for deriving an output signal indicative of the coincidence of the two output signals; integrating means for averaging the output signal derived from said coincidence means; and attenuator means for varying the level of the transmitted multilevel signal in accordance with the averaged output signal derived from said integrating means.

11. Apparatus as claimed in claim 1, wherein said receiving means includes attenuator means coupled to receive the transmitted multilevel signal; differential amplifier means coupled to receive the transmitted multilevel signal; a multilevel decoding circuit for receiving and detecting the levels of the received multilevel signal and for converting the detected levels into binary digit signals of n bits; first logic means coupled to said multilevel decoding circuit for providing signals indicative of the conditions 1 and 0 of the binary digits of the selected position of the reference level signal; first integrating means coupled to said first logic means for providing a first averaged signal thereof to said differential amplifier; second logic means coupled to said multilevel decoding circuit for providing output signals indicative of the conditions 1 and 0 of the binary digit of the selected position of the reference level signal and the binary digit of a more significant position; second integrating means coupled to said second logic means for providing a second averaged signal thereof to said attenuator means to thereby adjust the amplitude of the transmitted multilevel signal dependent upon the second averaged output signal.

* * * * *